United States Patent
Venables et al.

(10) Patent No.: US 9,944,363 B2
(45) Date of Patent: Apr. 17, 2018

(54) ELECTRIC FIN STABILIZER

(71) Applicants: John D. Venables, Monroe, CT (US); Christopher M. Pappas, Saint Leonard, MD (US)

(72) Inventors: John D. Venables, Monroe, CT (US); Christopher M. Pappas, Saint Leonard, MD (US)

(73) Assignee: Naiad Maritime Group, Inc., Shelton, CT (US)

( * ) Notice: Subject to any disclaimer, the term of this patent is extended or adjusted under 35 U.S.C. 154(b) by 120 days.

(21) Appl. No.: 14/926,340

(22) Filed: Oct. 29, 2015

(65) Prior Publication Data

US 2016/0121978 A1    May 5, 2016

Related U.S. Application Data

(60) Provisional application No. 62/072,225, filed on Oct. 29, 2014.

(51) Int. Cl.
*B63B 39/06* (2006.01)
*G05D 1/08* (2006.01)

(52) U.S. Cl.
CPC .......... *B63B 39/06* (2013.01); *G05D 1/0875* (2013.01)

(58) Field of Classification Search
None
See application file for complete search history.

(56) References Cited

U.S. PATENT DOCUMENTS

| | | | |
|---|---|---|---|
| 1,800,408 A | | 4/1931 | Schein |
| 2,550,752 A | | 5/1951 | Allan |
| 2,979,010 A | * | 4/1961 | Braddon ................. B63B 39/06 114/126 |
| 3,456,612 A | | 7/1969 | Rieprich |
| 3,924,555 A | | 12/1975 | Napolitano |
| 4,018,114 A | * | 4/1977 | Heiermann ............... B23B 5/12 82/130 |
| 4,023,516 A | * | 5/1977 | Bennett ................... B63B 39/06 114/126 |
| 4,273,063 A | * | 6/1981 | Berne ..................... B63B 39/06 114/126 |
| 4,887,244 A | * | 12/1989 | Willis ...................... G01V 1/28 367/40 |

(Continued)

FOREIGN PATENT DOCUMENTS

EP    2506235 A2  * 10/2012  .............. G08G 3/02

Primary Examiner — Rami Khatib
Assistant Examiner — Nicholas K Wiltey
(74) Attorney, Agent, or Firm — St. Onge Steward Johnston & Reens, LLC

(57) ABSTRACT

A marine vessel stabilizer and control including a fin having a stem extending into the hull. An arm is connected to the stem and extends towards a connector which is connected to a rod. A housing is connected to another end of the rod and a screw passes through the housing. A motor is connected to the screw and configured to rotate to rotate the fin. A controller is connected to the motor, a speed sensor, a roll sensor and a fin position sensor such that a control signal can be calculated and the position of the fin can be determined to reduce roll of the vessel both when making headway and when at rest (zero speed). When the vessel is at rest, the fin is be configured to rotate through maximum angles greater than 15 degrees from either side of a neutral position.

31 Claims, 7 Drawing Sheets

(56) References Cited

U.S. PATENT DOCUMENTS

| | | | | |
|---|---|---|---|---|
| 5,235,930 A * | 8/1993 | Pendleton | B63B 3/08 | 114/312 |
| 6,453,836 B1 * | 9/2002 | Ditmore | B63B 39/06 | 114/136 |
| 8,614,633 B1 * | 12/2013 | Lear | G08B 29/188 | 114/382 |
| 9,139,265 B2 * | 9/2015 | Peberdy | B63B 35/793 | |
| 9,180,940 B2 * | 11/2015 | Rikoski | B22D 31/00 | |
| 9,227,705 B2 * | 1/2016 | Van Aken | B63B 39/06 | |
| 9,476,411 B2 * | 10/2016 | Gaigler | F16L 1/23 | |
| 9,511,825 B1 * | 12/2016 | Henning | B63B 21/663 | |
| 2002/0091991 A1 * | 7/2002 | Castro | G06F 9/06 | 717/106 |
| 2005/0251300 A1 * | 11/2005 | Hellvik | G01F 23/14 | 701/21 |
| 2005/0278094 A1 * | 12/2005 | Swinbanks | B63B 17/0081 | 701/37 |
| 2007/0035661 A1 * | 2/2007 | Resner | G06F 1/3203 | 348/468 |
| 2008/0255757 A1 * | 10/2008 | Bruce | G01C 21/005 | 701/423 |
| 2010/0185471 A1 * | 7/2010 | Chen | G06Q 10/06 | 705/7.38 |
| 2012/0087207 A1 * | 4/2012 | Kostov | G01V 1/38 | 367/20 |
| 2012/0095946 A1 * | 4/2012 | Hansen | G01W 1/10 | 706/45 |
| 2012/0137950 A1 * | 6/2012 | Rapp | C25B 1/12 | 114/331 |
| 2013/0063300 A1 * | 3/2013 | O'Regan | E02B 15/00 | 342/357.25 |
| 2014/0114509 A1 * | 4/2014 | Venables | G05D 1/0875 | 701/21 |
| 2014/0180566 A1 * | 6/2014 | Malhotra | G08G 3/02 | 701/300 |
| 2014/0283728 A1 * | 9/2014 | Wang | B63G 11/00 | 114/261 |
| 2015/0096436 A1 * | 4/2015 | Venables | B63B 39/06 | 91/171 |
| 2015/0217837 A1 * | 8/2015 | Szydlowski | H01L 31/042 | 114/74 R |
| 2016/0195399 A1 * | 7/2016 | Nanri | B63B 49/00 | 701/21 |
| 2016/0343092 A1 * | 11/2016 | Legrand | G06Q 10/0831 | |

* cited by examiner

ELECTRIC FIN STABILIZER

FIELD OF THE INVENTION

The invention relates to stabilizers and control systems for stabilizers that are used for marine vessels both when making headway and at rest (e.g. zero speed).

BACKGROUND OF THE INVENTION

Fin roll stabilizers are commonly mounted to the bottom of a vessel below the waterline, usually close to the turn of the bilge. These fins rotate about an axis that is perpendicular to the lengthwise axis of the vessel. The stabilizers are generally aligned parallel to the lengthwise axis of the vessel and rotation of these fins reduces roll of the vessel. The fin roll stabilizers act in some ways that are similar to ailerons on an airplane.

Traditional fin roll stabilizers for marine vessels are powered hydraulically. In order to create a functioning stabilizing system, a complicated setup of hydraulic plumbing, valves, cylinders and pumps are needed to operate and control the stabilizer. In addition, a reservoir must be provided to supply the pumps with hydraulic fluid and a cooling system and filter is needed to prevent overheating and to keep the fluid clean. The hydraulic system components all need connection with hose or pipe which can run long distances within a vessel and be difficult to install and require maintenance.

Electrical sensors and controls are then needed to operate various valves within the hydraulic system to allow the stabilizers to move through varying degrees of rotation that depend on vessel speed and wave conditions that are causing the vessel to roll.

The hydraulic system also comes with added environmental concerns associated with hydraulic oil because a leak in the system can bleed in to the bilge of the vessel and be pumped out with bilge water into the ocean or other body of water where the marine vessel is operating.

The hydraulic fluid is often put under high pressure such that the associated parts within the system must be designed to withstand that substantial pressure. This adds cost to the system. In addition, air in the hydraulic system can cause control problems and when the air bubbles collapse they generate intense localized heat in the hydraulic oil leading to system overheating and early hydraulic component failure. Air in the system can also cause objectionable noise and vibration transmitted throughput the vessel via the interconnecting hydraulic piping.

Another concern of a shipboard hydraulic system is fire. At higher pressures the hydraulic system is more prone to leaks and when a leak occurs the oil can mist or spray onto hot surfaces in the vessel's machinery spaces or be vaporized, and when exposed to a source of ignition vaporized oil causes fire.

One alternative to hydraulics has been direct drive electric motors that rotate the fin shaft. Stabilizer fins often require high torque to operate such that a direct drive motor needs to be relatively large and heavy. A reduction gear between the motor and fin would reduce the motor size, but the gear arrangement and motor together adds a significant height to the stabilizer and may not fit in the confined space within the hull.

In addition, failure of part of the stabilizer system can result in a crippled vessel because the fins may be in fixed positions that make it difficult to move the vessel under power. For example, if the fin is at 20 degrees to the lengthwise axis of the vessel, moving the vessel through the water will cause an un-desired list and fin drag when under power.

SUMMARY OF THE INVENTION

It is therefore an object of the invention to provide a fin roll stabilizer that avoids use of expensive and complicated hydraulics and allows for easy installation and maintenance while still fitting in tight spaces of vessel hulls.

It is another object of the invention to provide a manual locking system that allows the position of the fins to be placed in a fixed and neutral position in the event of a failure.

The terms "first" and "second" are used to distinguish one element, set, object or thing from another, and are not used to designate relative position or arrangement in time.

The terms "coupled", "coupled to", "coupled with", "connected", "connected to", and "connected with" as used herein each mean a relationship between or among two or more devices, apparatus, constituting any one or more of (a) a connection, whether direct or through one or more other devices, apparatus, components, systems, subsystems, (b) a communications relationship, whether direct or through one or more other devices, apparatus, files, programs, media, components, networks, systems, subsystems, or means, and/ or (c) a functional relationship in which the operation of any one or more devices, apparatus, components, systems, or subsystems, depends, in whole or in part, on the operation of any one or more others thereof.

These and other objects are achieved by providing a marine vessel stabilizer and control system including a fin having a stem extending into the hull. An arm is connected to an end of the stem and extends towards a connector. The connector is connected to one end of a rod. A housing is connected to another end of the rod and a screw passes through the housing such a hollow section of the rod is arranged concentrically around the screw. A motor is connected to the screw and configured to rotate to thereby rotate the fin. A controller is connected to the motor, a speed sensor, a roll sensor and a fin position sensor such that a control signal can be calculated and the position of the fin can be determined to reduce roll of the vessel both when making headway and when at rest.

In one aspect a marine vessel stabilizer is provided and includes a fin having a stem extending therefrom towards an end. The stem is configured to extend through a hull of the marine vessel and further configured to rotate. An arm is connected to the end and extends away from the end to a connector. A rod includes a hollow section and is connected at a first end to the connector. A housing is coupled to a second end of the rod. A shaft passes through the housing such that the hollow section is arranged concentrically around the shaft. A motor is connected to the shaft and is configured to rotate the shaft to cause translational movement of the housing along an axis of the shaft to thereby rotate the fin.

The housing and shaft may make up a ball screw such that the shaft defines a helical raceway that receives ball bearings located inside the housing. A removable stop may be configured to engage the arm such that when the removable stop is engaged, the fin is fixed in a pre-determined position.

A sensor may be configured to read an angle of the fin and a controller is coupled to the sensor and motor and a roll sensor of the vessel. The controller reads from the roll sensor: a roll angle of the marine vessel, a change in the roll angle and combinations thereof. Software executes on the controller (which includes a processor or may be part of a computer) and the software calculates indicative of a desired position of the fin to reduce roll of the vessel. Typically, if the vessel is rolling to port, the port stabilizer will create an upward force and the starboard stabilizer will create a downward force to create a roll moment that acts on the marine vessel in opposition to the natural roll motion of the marine vessel. Since the motion of the vessel is often cyclical, the stabilizers may rotate back and forth opposite the roll of the vessel.

The controller transmits the control signal to the motor to thereby rotate the fin towards the desired position. The controller monitors a position of the fin via the sensor to determine when the position has reached the desired position.

In some cases, the sensor is a potentiometer and the sensor is coupled to the stem or the sensor is an encoder and is coupled to the motor or the housing. The controller may also communicate with a speed sensor to read a value indicative of a speed of the marine vessel. The desired position (and control signal) can be calculated at least in part based on the reading from the roll sensor and the value of the speed sensor. In some embodiments the roll sensor can measure various components of roll including roll angle, roll velocity, roll acceleration and combinations thereof.

A fixed housing may be coupled to the stem such that the stem rotates within the fixed housing. A removable stop may be configured to engage the fixed housing and the arm such that when the removable stop is engaged, the fin is fixed in a pre-determined position which may be a neutral position. The neutral position may place a lengthwise axis of the fin parallel to the lengthwise axis of the marine vessel. The lengthwise axis of the marine vessel is ordinarily found along a center plane (bow to stern) and is generally parallel to the water line.

The removable stop may be a pin that engages the fixed housing and the arm via a hole in the fixed housing and a hole in the arm. A screw is located in the fixed housing and is configured to rotate to contact and move the arm to align the hole of the fixed housing with the hole of the arm to allow the removable stop to engage.

In other aspects a marine vessel stabilizer is provided including a fin having a stem extending therefrom towards an end. The stem is configured to extend through a hull of the marine vessel and further configured to rotate. An arm is connected to the end and extends away from the end at a distance to a connector such that the connector is spaced apart from a center of the stem to create a lever. A rod is connected at a first end to the connector and a housing is coupled to a second end of the rod. A shaft passes through the housing and is connected to a motor configured to rotate the shaft to cause translational movement of the housing along an axis of the shaft which thereby rotates the fin. Other features described herein may be included in this embodiment.

In other aspects a marine vessel stabilizer is provided with a fin having a stem extending therefrom towards an end, the stem configured to extend through a hull of the marine vessel. A fixed housing receives the stem through a hole in the fixed housing and the stem is configured to rotate in the hole. An arm is connected to the end and extends away from the end at a distance to a connector such that the connector is spaced apart from a center of the stem to create a lever. A removable stop is configured to engage the fixed housing and the arm such that when the removable stop is engaged, the fin is in a pre-determined position. Other features described herein may be included in this embodiment.

In another aspect a marine vessel stabilizer system is provided including a fin having a stem extending therefrom towards an end, the stem configured to extend through a hull of the marine vessel and further configured to rotate. An arm is connected to the end and extends away from the end to a connector. A rod has a hollow section and is connected at a first end to the connector. A housing is coupled to a second end of the rod. A shaft passes through the housing such that the hollow section is arranged concentrically around the shaft. A motor is connected to the shaft and is configured to rotate the shaft such that rotation of the shaft causes translational movement of the housing along an axis of the shaft to thereby rotate the fin. A controller is in communication with the motor, a sensor and a roll sensor. The controller calculates a control signal for the motor based on a reading from the sensor indicative of a position of the fin and a value from the roll sensor indicative of: a roll angle of the marine vessel, a change in roll angle of the marine vessel and combinations thereof. A fixed housing receives the stem through a hole in the fixed housing. The stem is configured to rotate in the hole. A removable stop is configured to engage the fixed housing and the arm such that when the removable stop is engaged, the fin is in a neutral position in the event of a failure of one or more parts of the marine vessel stabilizer system.

The connector may be removable to allow the arm to rotate to align the fixed housing and the arm so the removable stop can be installed.

DETAILED DESCRIPTION OF THE INVENTION

Figure 1:
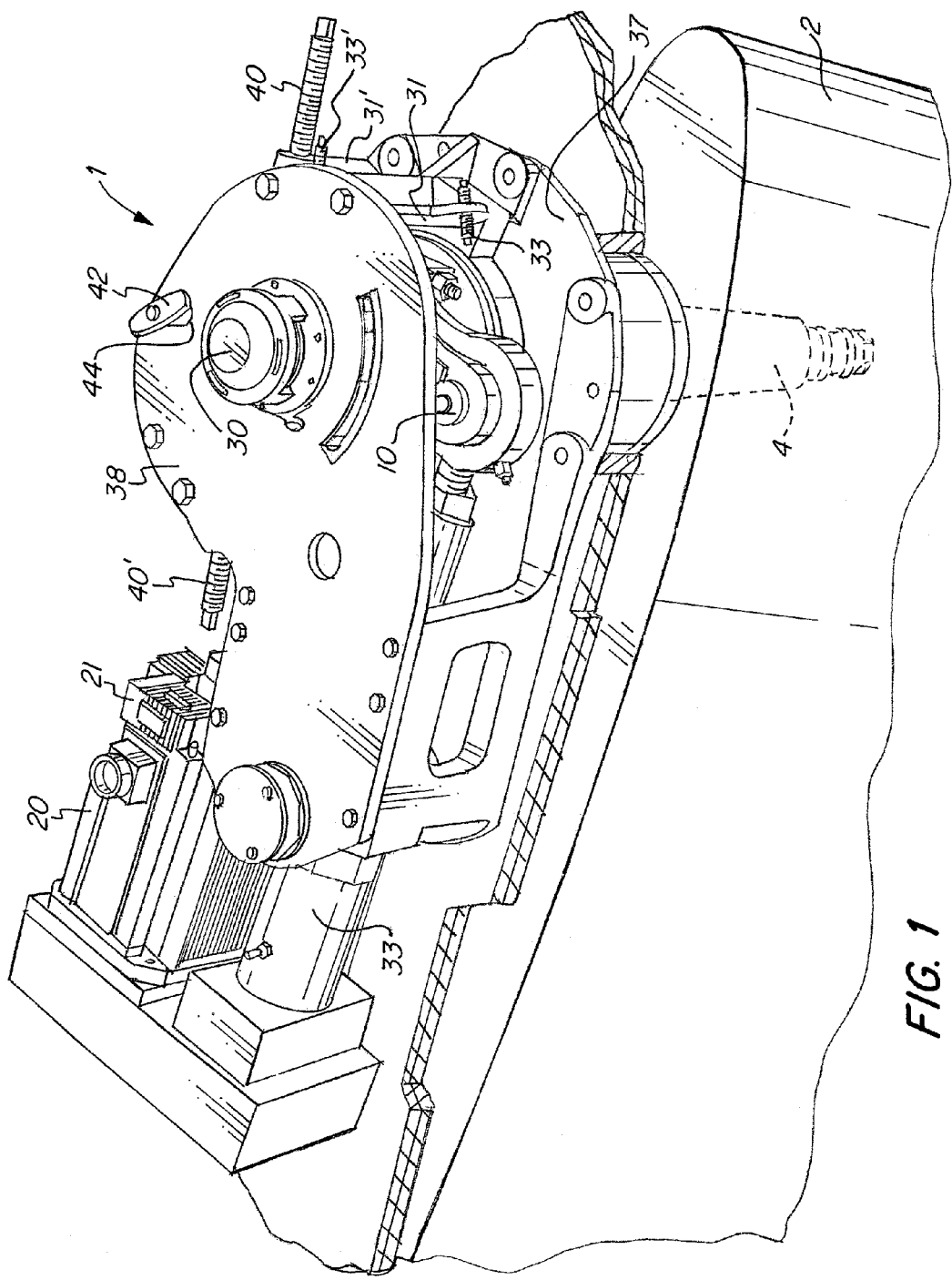
FIG. 1 is a perspective view of the fin roll stabilizer according to the present invention
Figure 2:
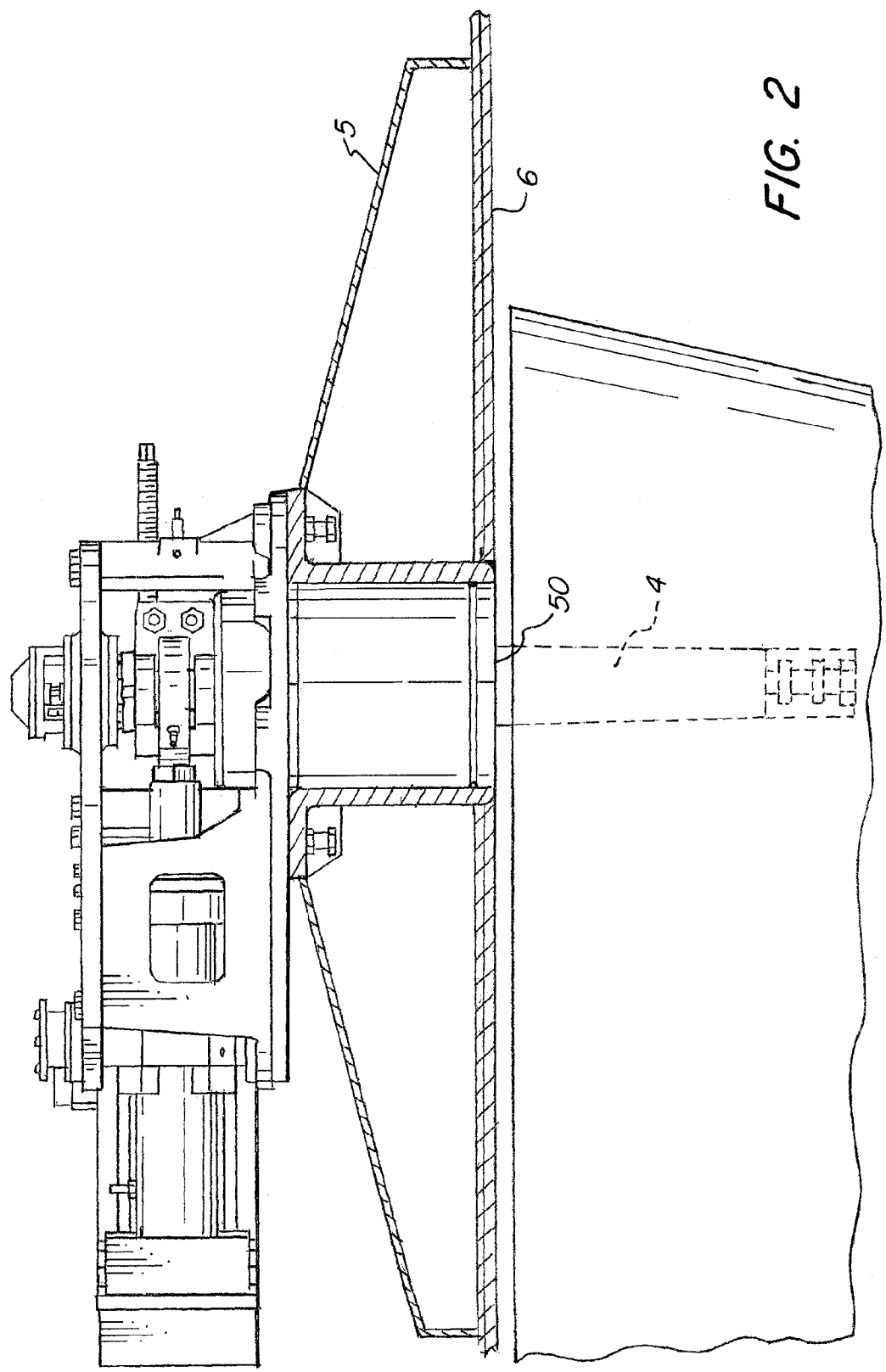
FIG. 2 is a right side view of the fin roll stabilizer of FIG. 1
Figure 3:
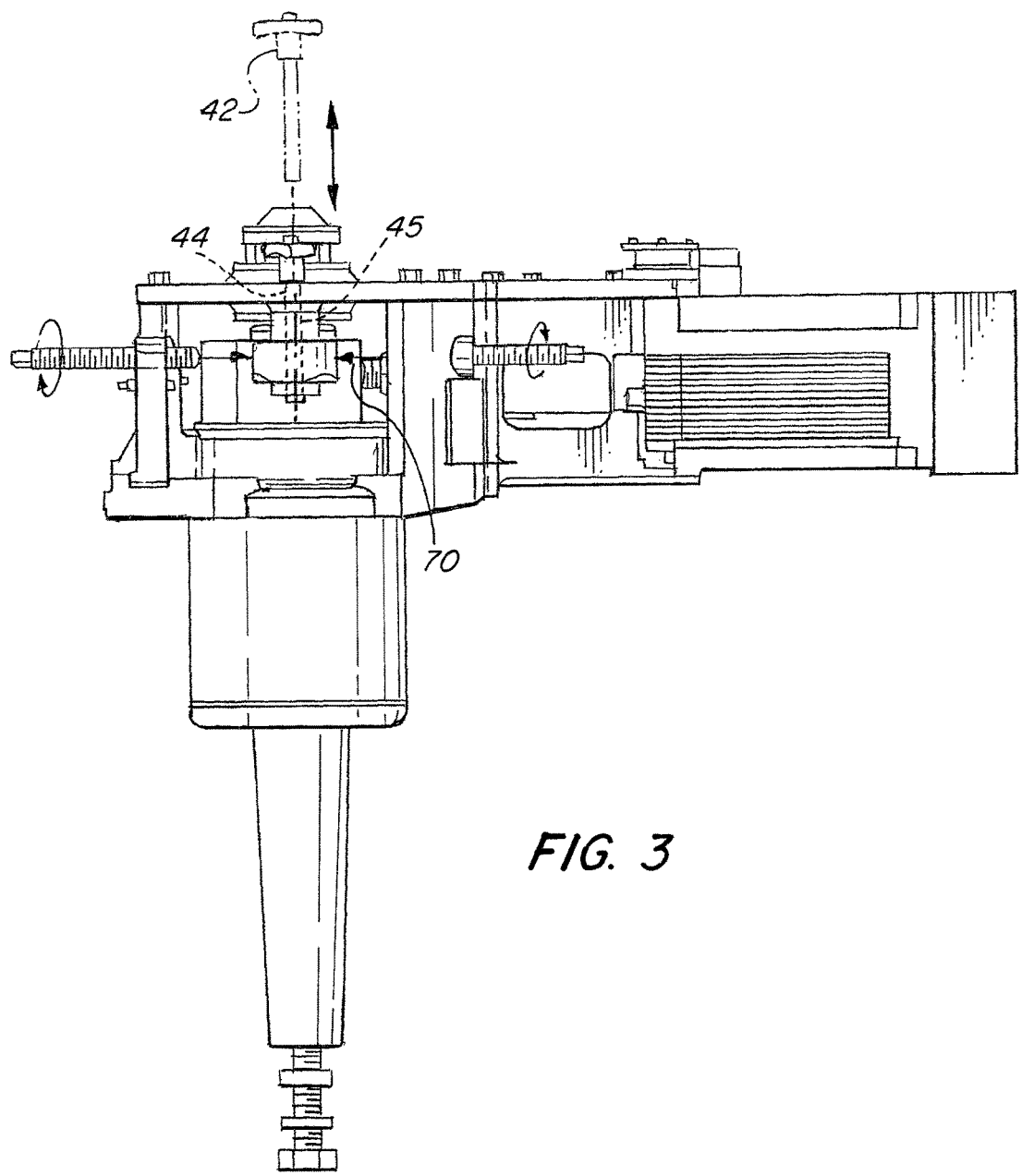
FIG. 3 is left side view of the fin roll stabilizer of FIG. 1

Referring now to the drawings, wherein like reference numerals designate corresponding structure throughout the views. The following examples are presented to further illustrate and explain the present invention and should not be taken as limiting in any regard.

Figure 6:
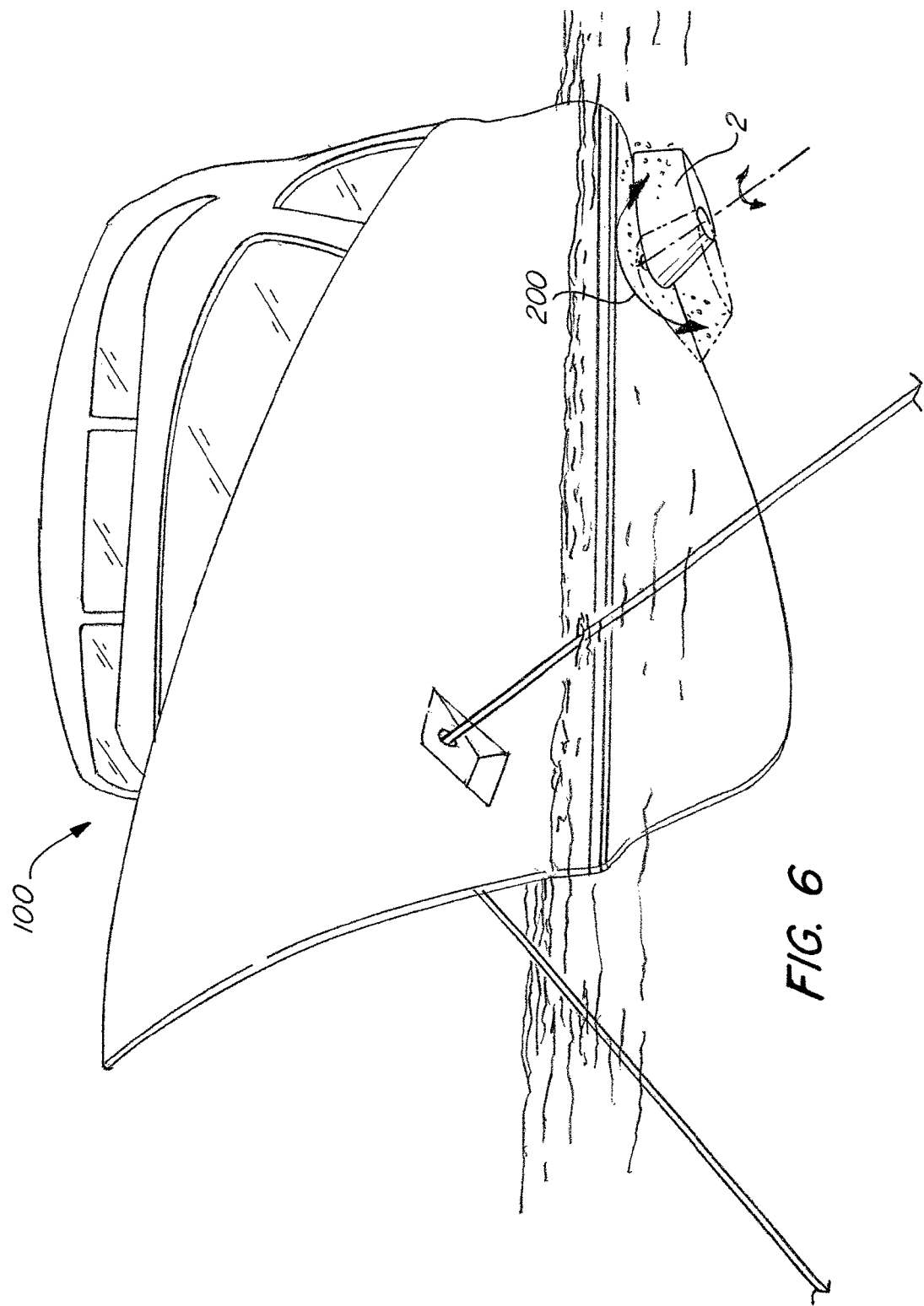
FIG. 6 is a perspective view of a vessel having the fin roll stabilizer of FIG. 1 installed thereon.

The stabilizer 1 includes a fin 2 that is installed on the outside of the vessel hull 6. The fin is generally installed in the hull below the waterline usually near the turn of the bilge such that rotation of the fin in the water creates a roll moment acting on the marine vessel that counteracts roll of the marine vessel due to conditions of the body of water in which the vessel is operating. As shown in FIG. 6, the plane of fin 2 is mounted normal to the hull, but other mounting angles are contemplated. As can be understood in FIG. 6, the stem 4 is approximately perpendicular to the lengthwise axis of the vessel when viewed from the side, but need not be depending on hull shape or other factors. As but one example, four or more fins could be mounted to the hull and the forward pair of fins would be approximately normal to the hull, but not necessarily perpendicular to the lengthwise axis. The fin 2 includes a stem 4 which extends into the hull 6. The hull includes a mount 5 that is connected to the fixed housing 37 of the stabilizer mechanism 1. A seal 50 keeps the hull watertight while allowing the stem 4 and fin 2 to rotate.

The fixed housing 37 includes a hole with a bearing 7 therein that receives the stem 4. The end of the stem 4 that extends into the fixed housing 37 is coupled to an arm 8 to allow rotation of the arm to rotate the fin. One end of the arm includes a hole that receives a connector 10 that couples the arm to a rod 12. The connector 10 may be removable that can be taken out in the event of a failure of the system. For example, if the motor 20 becomes locked in place, the connector 10 can be taken out and the fin 2 can be locked in a neutral position as discussed in further detail below.

The rod 12 shown includes a hollow section. A shaft 16 is concentrically arranged with the rod 12 and is located inside the hollow section (depending on the position of the fin). As the shaft 16 rotates, housing 14 moves back and forth (depending on the shaft rotation direction) along the axis of the shaft. The other end of the rod 12 is coupled to the housing 14. The shaft 16 is rotated by the motor 20 to cause linear translation of the housing 14 and thereby cause rotation of the arm 8 and fin 2. It is understood that the rod 12 being coupled/connected to the housing 14 could mean that these parts are two separate pieces that are bolted or otherwise fastened together or it could also mean that the rod 12 and housing 14 are sections of a single part that is milled/cast or otherwise formed to provide the parts that make up the ball screw that provides the linear actuation.

Figure 4:
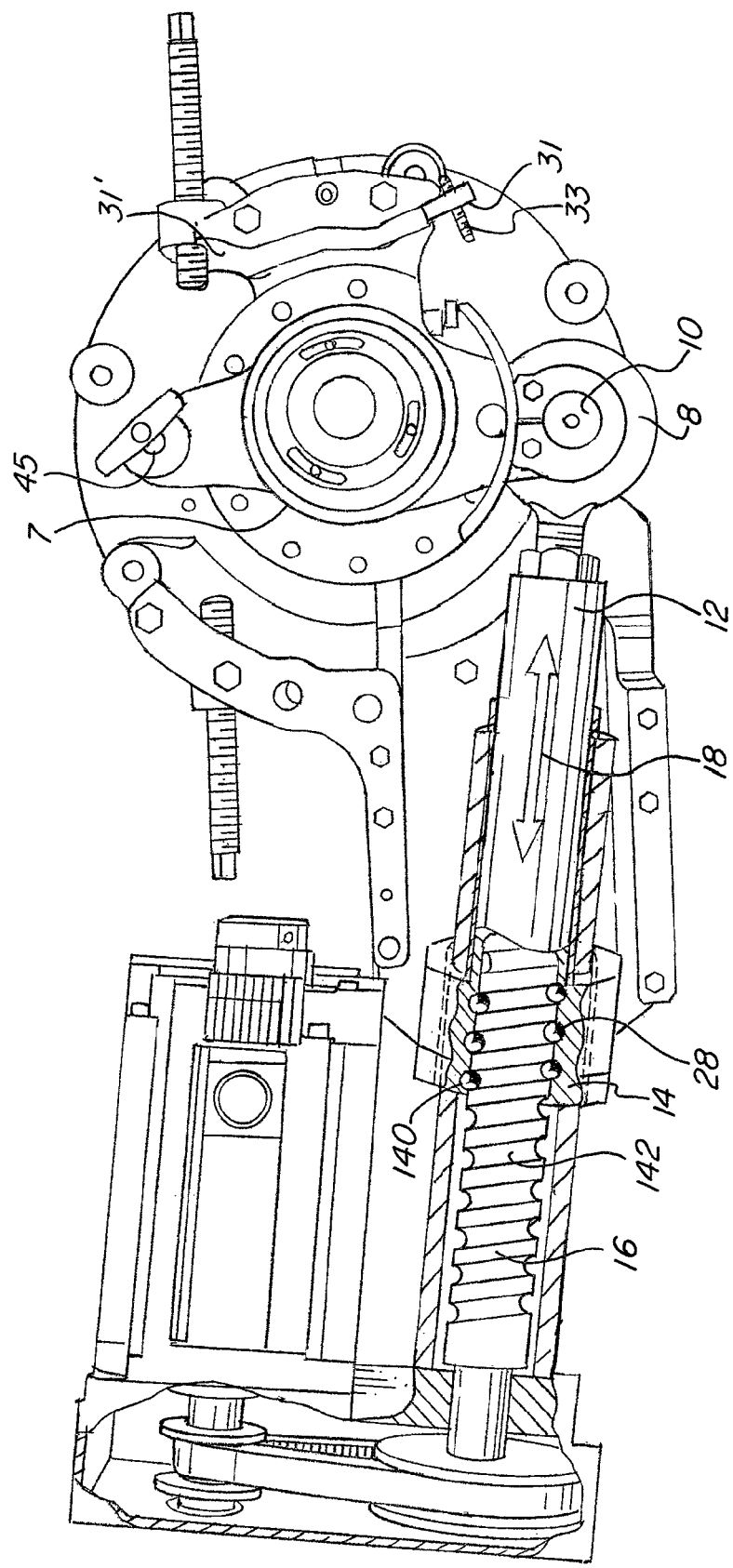
FIG. 4 is a top partial cutaway view of the fin roll stabilizer of FIG. 1

FIG. 4 shows the fin stabilizer as a partial cutaway view with cover 38 removed. The housing 14 and shaft 16 are shown arranged as a ball screw, but it is understood that other linear actuation systems can be used. The housing 14 includes a number of balls 28 therein and the housing also includes helical race section 140, and the shaft 16 is configured as a screw to define a second helical race section 142. The housing holds the balls 28 in place relative to the housing (and inside the helical race section 140). This allows rotation of the shaft 16 to cause translational movement 18 of the rod 12 along the axis of the shaft. Although a ball screw configuration is shown, others may be used, for example a threadless ball screw can be used or a simple threaded nut or section could be considered one type of housing used. Other linear actuator mechanisms that are driven by electrical motors could be used.

Figure 5:
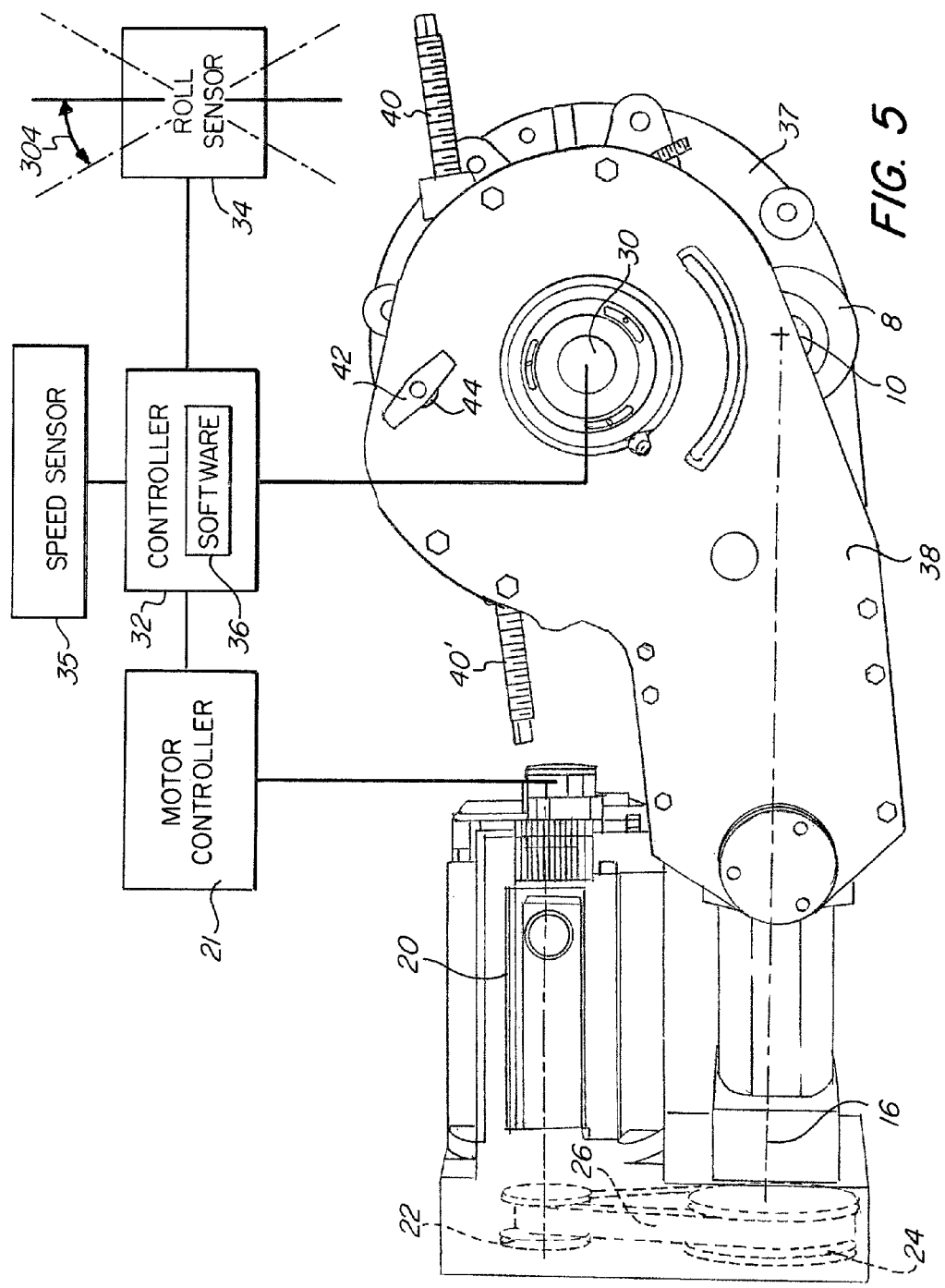
FIG. 5 is a top view of the fin roll stabilizer of FIG. 1 further showing the control system thereof.

In one embodiment shown (see FIG. 5), the motor 20 drives a belt/pulley mechanism. Small pulley 22 is connected to the motor shaft and drive belt is connected between the small pulley 22 and large pulley 24. Large pulley 24 is connected to shaft 16, thus connecting the drive shaft of the motor 20 to the shaft 16. It is understood that various gear arrangements can be included or replace the belt/pulley mechanism shown.

The cover 38 of the fixed housing 37 is shown with sensor 30 arranged therein. Sensor 30 as shown is a potentiometer, meaning that as part of the potentiometer rotates, the electrical resistance thereof changes. Based on the resistance, it is possible to determine the angle of the fin because part of sensor 30 is connected to the stem 4 of the fin 2.

It is understood that the potentiometer may be replaced with an encoder. For example linear encoders are known in the art. See U.S. Pat. No. 3,816,003, the content of which is incorporated herein by reference. This linear encoder may be positioned to contact the housing 14 as it is moved back and forth and the linear encoder may be connected to the controller 32 or motor controller 21. Other encoders may be used. As another alternative, optical rotation encoders such as the one disclosed in U.S. Pat. No. 4,152,589, the content of which are incorporated herein by reference. This rotational encoder may be connected to the motor (i.e. a rotating part such as the drive shaft thereof or one of the other rotating parts coupled to the motor). Based on the number of rotations of the encoder, the position of the fin can be determined as would be apparent to one of skill in the art. An example encoder is shown in the figures, for example, see the round part of the motor opposite the pulleys (near the end of emergency screw 40').

Emergency screws 40/40' are arranged in the fixed housing 37 and can be used in the event of failure. Removable stop 42 is arranged in a hole 44 in the cover 38. If there is a failure that requires manual override, a user is able to rotate the emergency screws 40/40' to thereby contact arm 8 at location 70 and rotate the arm 8 into alignment with hole 44. As shown, the arm 8 includes two sides, one for the connector 10 and the other for the removable stop 42. Hole 45 receives the removable stop 42 when aligned with hole 44. The removable stop 42 is shown with two positions, retracted (not in contact with arm 8) and extended such that the pin of the removable stop 42 engages with holes 44 and 45 to lock the fin in a neutral position that minimizes the impact of the fin 2 on the roll of the vessel. It is understood that the stabilizer 1 can include a storage location for the removable stop 42 to be held when not engaged in the emergency/failure condition.

Sensor 30 is in communication with a controller 32. Controller 32 is also in communication with motor 20 and roll sensor 34. Roll sensor 34 allows the controller 32 to determine angle or change in angle of the hull about the lengthwise axis of the vessel. Based on the angle, rate of change of the angle, or acceleration of the angle (or a combination), the software 36 of the controller 32 determines a control signal that is transmitted to the motor 20. The control signal will indicate a desired position of the fin that is calculated by the controller. The controller then monitors sensor 30 to determine when the desired position is met. Part of the control signal may indicate how quickly fin 2 is to be rotated, the controller can determine this value based on a rate of change of the angle as measured via sensor 30.

It is understood that the controller may be configured as a feedback loop that regularly adjusts the desired position of the fin based on the actual impact to the roll angle (or rate of change or acceleration therof) as determined via the roll sensor 34. As shown, roll sensor 34 allows for measurement of the roll angle 304 (or rate of change or acceleration in the roll angle). The fin 2 angle range 200 would be synchronized with the roll angle/change and/or acceleration in roll angle to counteract and reduce the total roll of the marine vessel.

Speed sensor 35 may also be relevant to the controller. For example, the amount of movement of the fin required to counteract roll of the vessel at rest may be much larger than when the vessel is making headway. For example, FIG. 6 shows a large angle range 200 in rotation of the fin 2. It is understood that when making headway, the angle range 200 may be larger, smaller or may be fixed, depending on the waterway conditions, the operation of the vessel and hydrodynamic parameters of the vessel and the fin 2. As one example, the control signal may indicate smaller changes in desired positon(s) of the fin when speed sensor 35 indicates that the vessel is making headway and as the speed is greater, smaller angle ranges 200 or changes in angle may be used. Many speed sensors exist such as impellers, pitot tubes, GPS and others and one or more of these and other known sensors could be used to determine speed of the vessel. It is also understood that the vessel may not be making headway but that it may be moored in a current. The speed sensor may be configured to determine the speed of the boat relative to the current and this speed can be used to allow the controller to adjust the control signal appropriately (i.e. smaller change in fin rotation angle due to expected increase in moment due to current).

The shaft 16 and housing 14 are configured to allow for the stabilizer to operate both when the vessel is at rest (i.e. at anchor, moored, adrift) and when making headway. Therefore, the shaft 16 is sufficiently long to enable relatively large changes in the fin rotation angle and movement of the housing between ends of the shaft. For example, the fin may rotate 40 degrees on either side of neutral when the vessel is at rest. Larger and smaller maximum angles are contemplated. In some embodiments, the maximum rotation is at least 15, at least 25 or at least 35 degrees on either side of neutral.

Figure 7:
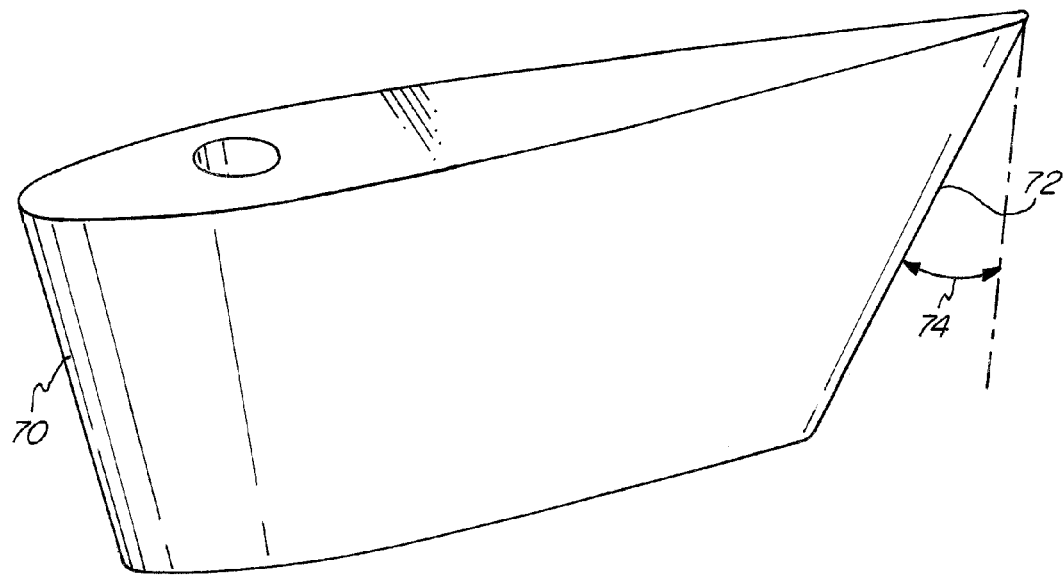
FIG. 7 is a perspective view of the fin shown in FIG. 1

As can be seen in FIG. 7, the fin 2 is of a foil shape that has a chord length defined as a distance between a nose 70 and a tail 72 of the fin. Other shapes can be used for the fin and the specific shape shown is exemplary only. In the example shown, the tail is tapered 74 towards the nose, however, the angle of the taper 74 could be vertical. The taper 74 could also increase the cord length outwardly such that the root cord (near the hull) is shorter than the tip cord (distal of the hull) or alternatively, the fin could be configured as a swept foil where the leading and trailing edge both extend aft from root to tip. Many foils shapes are known in the art. For example the National Advisory Committee for Aeronautics (NACA) publishes data on numerous foils. Although NACA data commonly refers to airfoils, the data is generally applicable to other foils such as hydrofoils the only difference being the fluid medium. Commonly, these NACA airfoil shapes are dimensionless such that any given chord length allows one to generate the foil shape, for example, coordinates on the shape are often specified as % chord from nose (x axis) and % chord (y axis), but other curves and patterns can be used to define the shape of the foil. The foil used for the fin 2 would most often be selected from a symmetrical type of foil, i.e. a foil that has the same shape above and below a centerline drawn from nose to tail. These are sometimes referred to as a "tear drop" shape. This shape allows for low drag when the marine vessel is making headway, but the length of the foil provides sufficient surface area such that when the marine vessel is at rest, rotation of the stem can generate a roll moment to counteract the roll of the vessel.

Depending on the foil selected, stall angles can be measured by measuring lift of the foil in a fluid tunnel, or stall angles may have already been determined by NACA data. A stall is a condition that occurs where the angle of attack increases beyond a certain point such that the lift begins to decrease. This commonly is relevant when the foil is moving through the water (when the marine vessel is making headway). The angle at which this occurs is called the critical angle of attack and is referred herein as a "stall angle." This angle is dependent upon the foil section or profile of the fin, its planform, its aspect ratio, its speed through the water, and other factors, but typically in the range of 10 to 30 degrees relative to the incoming flow for most foils. The critical angle of attack ("stall angle") is the angle of attack on the lift coefficient versus angle-of-attack curve at which the maximum lift coefficient occurs.

Flow separation begins to occur at small angles of attack while attached flow over the fin is still dominant. As angle of attack increases, the separated regions on the top of the fin increase in size and hinder the fin's ability to create lift. At the critical angle of attack, separated flow is so dominant that further increases in angle of attack produce less lift and vastly more drag.

When the marine vessel is making headway, the fin may be limited by the controller to operate within a maximum range of angles that are constrained by the stall angle on either side of neutral. When the vessel is making headway, small changes in the angle can generate very large lifts on the foil and in this case, the foil acts as would be expected based on NACA data. For example, the center of pressure on the foil may be located close to the quarter-chord point. Most foils generate a center of pressure located between 20-30% of the chord length.

However, when the marine vessel is at rest, lift forces due to the angle of attack of the fin and the speed of the fin through the water are largely irrelevant because the speed is too low to generate any significant lift or roll moment. At rest, the angular speed/acceleration of the fin about the axis of the stem is what causes the roll moment generated by the fin that counteracts the roll of the marine vessel. In order to generate this roll moment at rest, high torque levels are needed.

Figure 8:
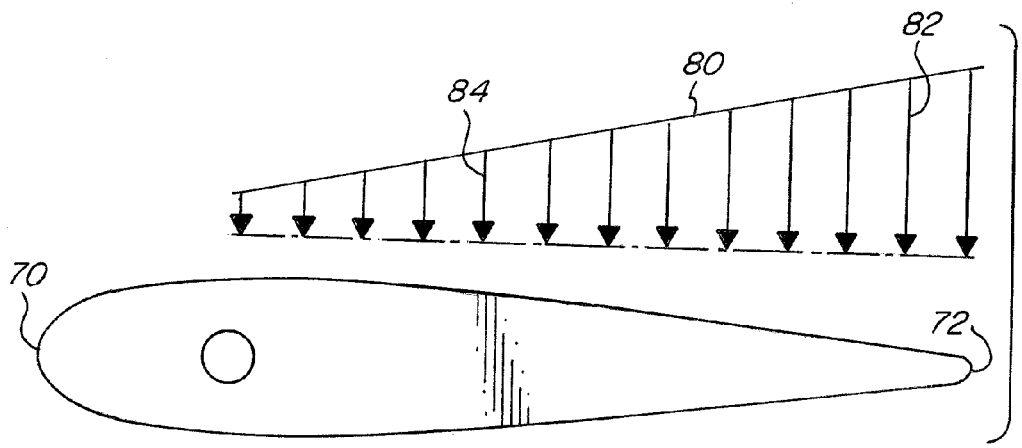
FIG. 8 is a side view of the fin of FIG. 1 showing an example pressure distribution thereon due to rotation of the fin.

FIG. 8 shows an example of the forces generated as the fin rotates while the marine vessel is at rest (zero speed). In this figure, the fin is rotating counter clockwise and as can be seen, the pressure is distributed such that larger pressures are created where the fin is moving faster (i.e. closer to the tail 72). In this instance, the center or pressure is located at a distance approximately ⅔ of the chord length measured from the nose.

Therefore, at rest, the stabilizer is configured to use the linear actuator system described herein and to rotate through angle ranges (on either side of neutral) that are greater than the stall angle. In addition a change or rate of change of the fin rotation angle causes the roll moment or alternatively that so long as the fin rotation angle is changing a roll moment is generated by the fin. With one exception being that at the end of the travel of the fin where the fin momentarily stops and the flow/circulation of the fluid momentarily causes a roll moment generated by the stabilizer.

The controller 32 may also be configured to limit rotation of the motor 20 based on the position of the housing 14 relative to the shaft 16. This would prevent the shaft from rotating too far such that the housing either comes off one end of the shaft or the housing becomes stuck at the end of the shaft that is connected to the motor (or pulley 24).

The fixed housing 37 may also be configured to prevent over rotation of the shaft 16. As can be seen, edges 31/31' or emergency screws 40/40' may act as stops that restrict rotation of the arm 8 and thereby restrict how far rod 12 can move back and forth. The positioning of edges 31/31' or emergency screws 40/40' can be such that housing 14 always stays engaged with the shaft 16 without over-rotating. It is also understood that adjustable stop 33/33' may be connected to an edge 31/31' to provide an electrical signal to motor controller 21, as adjusted to the arm 8. It is understood that these adjustable stops 33/33' may be connected both to the arm 8, both to the edges 31/31' and combinations thereof.

It is also understood that limit sensors can be enclosed within the actuator assembly 331 and connected to motor controller 21 or controller 32 (or both). For example a limit sensor may be located close to either end of the shaft 16 such that when the housing 14 comes in contact with the limit sensor, the motor shuts off or cannot rotate the screw further in the direction that would move the housing beyond the limit sensor. Various optical and mechanical switches/sensors could be used for these limit sensors as would be understood to one of skill in the art. These limit sensors may be coupled directly to a separate motor controller 21 or the controller 32. The motor controller 21 may be a DC or AC motor controller, depending on which type of motor is being used. The motor controller would then be coupled to controller 32.

The motor controller 21 may be a servo controller in some embodiments. Some examples of servo controllers use position feedback to close the control loop. This is commonly implemented with encoders, resolvers, and Hall effect sensors to directly measure the position of the motor rotor. Other position feedback methods measure the back EMF (electro motive force) in the undriven coils to infer the rotor position, or detect the Kick-Back voltage transient (spike) that is generated whenever the power to a coil is instantaneously switched off. A servo may be controlled using pulse-width modulation (PWM). How long the pulse remains high determines where the motor will try to position itself. Other motor types and motor controllers would be apparent to one of skill in the art and the specific embodiment described is not limiting.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A marine vessel stabilizer comprising:
   a fin having a stem extending therefrom, the stem configured to extend through a hull of the marine vessel and further configured to rotate, the stem having an end;
   an arm connected to the end and extending away from the end to a connector;
   a rod having a hollow section and connected at a first end to the connector;
   a housing coupled to a second end of said rod;
   a shaft passing through said housing such that the hollow section is arranged concentrically around said shaft;
   an electric motor connected to said shaft and configured to rotate said shaft such that rotation of said shaft causes translational movement of said housing along an axis of said shaft to thereby rotate said fin.

2. A marine vessel stabilizer comprising:
   a fin having a stem extending therefrom, the stem configured to extend through a hull of the marine vessel and further configured to rotate, the stem having an end;
   an arm connected to the end and extending away from the end to a connector;
   a translation device including a rod, a housing, a shaft and first and second ends;
   the rod having a hollow section;
   the housing coupled to said rod;
   the shaft passing through said housing such that the hollow section is arranged concentrically relative to said shaft;
   said translation device connected to said connector
   a motor connected to said translation device and configured to rotate a part thereof such that the rotation of part of the translation device causes rotation of said fin;
   wherein said fin is a foil shape; and
   a controller in communication with said motor and configured to rotate said fin such that a center of pressure of water against said fin is located at a distance from a nose of said fin at least 50% or more of a chord length of said fin.

3. A marine vessel stabilizer comprising:
   a fin having a stem extending therefrom, the stem configured to extend through a hull of the marine vessel and further configured to rotate, the stem having an end;
   an arm connected to the end and extending away from the end to a connector;
   a translation device including a rod, a housing, a shaft and first and second ends;
   the rod having a hollow section;
   the housing coupled to said rod;
   the shaft passing through said housing such that the hollow section is arranged concentrically relative to said shaft;
   said translation device connected to said connector
   a motor connected to said translation device and configured to rotate a part thereof such that the rotation of part of the translation device causes rotation of said fin;
   a controller in communication with said motor and configured to rotate said fin through an angle of at least 15 degrees on either side of a neutral position said fin when the marine vessel is at rest.

4. The device of claim 3 wherein said angle is at least 25 degrees.

5. The device of claim 4 wherein said angle is at least 35 degrees.

6. A marine vessel stabilizer comprising:
   a fin having a stem extending therefrom, the stem configured to extend through a hull of the marine vessel and further configured to rotate, the stem having an end;
   an arm connected to the end and extending away from the end to a connector;
   a translation device including a rod, a housing, a shaft and first and second ends;
   the rod having a hollow section;
   the housing coupled to said rod;
   the shaft passing through said housing such that the hollow section is arranged concentrically relative to said shaft;
   said translation device connected to said connector
   a motor connected to said translation device and configured to rotate a part thereof such that the rotation of part of the translation device causes rotation of said fin; and
   a fin rotation angle measured about the stem, and
   wherein so long as the fin rotation angle is changing a roll moment is generated by the fin.

7. A marine vessel stabilizer comprising:
   a fin having a stem extending therefrom, the stem configured to extend through a hull of the marine vessel and further configured to rotate, the stem having an end;
   an arm connected to the end and extending away from the end to a connector;
   a translation device including a rod, a housing, a shaft and first and second ends;
   the rod having a hollow section;
   the housing coupled to said rod;

the shaft passing through said housing such that the hollow section is arranged concentrically relative to said shaft;

said translation device connected to said connector a motor connected to said translation device and configured to rotate a part thereof such that the rotation of part of the translation device causes rotation of said fin;

wherein said fin is of a foil shape having a stall angle and further comprising a controller configured to rotate said fin at an angle on either side of a neutral position through an angle that is greater than said stall angle when the marine vessel is at rest.

8. A marine vessel stabilizer comprising:

a fin having a stem extending therefrom, the stem configured to extend through a hull of the marine vessel and further configured to rotate, the stem having an end;

an arm connected to the end and extending away from the end to a connector;

a translation device including a rod, a housing, a shaft and first and second ends;

the rod having a hollow section;

the housing coupled to said rod;

the shaft passing through said housing such that the hollow section is arranged concentrically relative to said shaft;

said translation device connected to said connector a motor connected to said translation device and configured to rotate a part thereof such that the rotation of part of the translation device causes rotation of said fin;

said housing and said shaft make up a ball screw such that said shaft defines a helical raceway that receives ball bearings located inside said housing.

9. A marine vessel stabilizer comprising:

a fin having a stem extending therefrom, the stem configured to extend through a hull of the marine vessel and further configured to rotate, the stem having an end;

an arm connected to the end and extending away from the end to a connector;

a translation device including a rod, a housing, a shaft and first and second ends;

the rod having a hollow section;

the housing coupled to said rod;

the shaft passing through said housing such that the hollow section is arranged concentrically relative to said shaft;

said translation device connected to said connector a motor connected to said translation device and configured to rotate a part thereof such that the rotation of part of the translation device causes rotation of said fin; and a removable stop configured to engage said arm such that when said removable stop is engaged, said fin is fixed in a pre-determined position.

10. A marine vessel stabilizer comprising:

a fin having a stem extending therefrom, the stem configured to extend through a hull of the marine vessel and further configured to rotate, the stem having an end;

an arm connected to the end and extending away from the end to a connector;

a translation device including a rod, a housing, a shaft and first and second ends;

the rod having a hollow section;

the housing coupled to said rod;

the shaft passing through said housing such that the hollow section is arranged concentrically relative to said shaft;

said translation device connected to said connector a motor connected to said translation device and configured to rotate a part thereof such that the rotation of part of the translation device causes rotation of said fin;

a sensor configured to read an angle of said fin;

a controller coupled to said sensor and said motor and further coupled to one or more roll sensors of said vessel, said controller reading from said roll sensors a reading indicative of: a roll angle of the marine vessel, a rate of change of the roll angle or acceleration of the roll angle, and combinations thereof;

software executing on said controller and calculating a control signal indicative of a desired position of said fin to reduce roll of the vessel;

said controller transmitting said control signal to said motor to thereby rotate said fin towards the desired position;

said controller monitoring a position of said fin via the sensor to determine when said position has reached the desired position.

11. The device of claim 10 wherein said sensor is a potentiometer.

12. The device of claim 11 wherein said sensor is coupled to said stem.

13. The device of claim 10 wherein said sensor is an encoder.

14. The device of claim 13 wherein said sensor is coupled to said electric motor or said housing or said stem.

15. The device of claim 10 wherein said controller is further in communication with a speed sensor to read a value indicative of a speed of the marine vessel, wherein the desired position is calculated at least in part based on the reading and the value.

16. A marine vessel stabilizer comprising:

a fin having a stem extending therefrom, the stem configured to extend through a hull of the marine vessel and further configured to rotate, the stem having an end;

an arm connected to the end and extending away from the end to a connector;

a translation device including a rod, a housing, a shaft and first and second ends;

the rod having a hollow section;

the housing coupled to said rod;

the shaft passing through said housing such that the hollow section is arranged concentrically relative to said shaft;

said translation device connected to said connector a motor connected to said translation device and configured to rotate a part thereof such that the rotation of part of the translation device causes rotation of said fin; and a fixed housing coupled to the stem such that the stem rotates within said fixed housing;

a removable stop configured to engage said fixed housing and said arm such that when said removable stop is engaged, said fin is fixed in a pre-determined position.

17. The device of claim 16 wherein said pre-determined position is a neutral position of said fin.

18. The device of claim 17 wherein said neutral position places a lengthwise axis of the fin parallel to the lengthwise axis of the marine vessel.

19. The device of claim 16 wherein said removable stop is a pin that engages said fixed housing and said arm via a hole in said fixed housing and a hole in said arm.

20. The device of claim 19 further comprising:
at least one screw in said fixed housing and configured to rotate to contact and move the arm to align the hole of said fixed housing with the hole of said arm.

21. A marine vessel stabilizer comprising:
a fin having a stem extending therefrom, the stem configured to extend through a hull of the marine vessel and further configured to rotate, the stem having an end;
an arm connected to the end and extending away from the end at a distance to a connector such that the connector is spaced apart from a center of the stem to create a lever;
a rod connected at a first end to the connector;
a housing coupled to a second end of said rod;
a shaft passing through said housing;
an electric motor connected to said shaft and configured to rotate said shaft to cause translational movement of said housing along an axis of said shaft which thereby rotates said fin.

22. The device of claim 21 wherein said housing and said shaft make up a ball screw such that said shaft defines a helical raceway that receives ball bearings located inside said housing.

23. The device of claim 21 further comprising:
a sensor configured to read an angle of said fin;
a controller coupled to said sensor and said electric motor and further coupled to one or more roll sensors of the marine vessel, said controller reading from said roll sensors a reading indicative of: a roll angle of the marine vessel, a rate of change of the roll angle or acceleration of the roll angle, and combinations thereof;
software executing on said controller and calculating a control signal indicative of a desired position of said fin to reduce roll of the marine vessel;
said controller transmitting said control signal to said electric motor to thereby rotate said fin towards the desired position;
said controller monitoring a position of said fin via the sensor to determine when said position has reached the desired position.

24. The device of claim 23 wherein said sensor is a potentiometer or an encoder.

25. The device of claim 24 wherein said potentiometer is coupled to said stem and said encoder is coupled to said electric motor or said housing or said stem.

26. The device of claim 23 wherein said controller is further in communication with a speed sensor to read a value indicative of a speed of the marine vessel, wherein the desired position is calculated at least in part based on the reading and the value.

27. A marine vessel stabilizer system comprising:
a fin having a stem extending therefrom, the stem configured to extend through a hull of the marine vessel and further configured to rotate, the stem having an end;
an arm connected to the end and extending away from the end to a connector;
a rod having a hollow section and connected at a first end to the connector;
a housing coupled to a second end of said rod;
a shaft passing through said housing;
a motor connected to said shaft and configured to rotate said shaft when the marine vessel is at rest such that rotation of said shaft causes translational movement of said housing along an axis of said shaft to thereby rotate said fin between a maximum angle on either side of a neutral position of said fin wherein the maximum angle is at least 15 degrees.

28. The system of claim 27 wherein said fin is of a foil shape having a stall angle and said motor rotates said fin at an angle on either side of a neutral position and the angle is greater than said stall angle.

29. The system of claim 27 further comprising:
a controller in communication with said electric motor, a sensor and a roll sensor, said controller calculating a control signal for said motor based on a reading from the sensor indicative of a position of the fin and a value from the roll sensor indicative of: a roll angle of the marine vessel, a rate of change in the roll angle or acceleration of the roll angle of the marine vessel, and combinations thereof;
a fixed housing receiving said stem through a hole in said fixed housing, the stem configured to rotate in said hole.

30. The system of claim 29 further comprising:
a removable stop configured to engage said fixed housing and said arm such that when said removable stop is engaged, said fin is in a neutral position to neutralize the fin in the event of a failure of one or more parts of the marine vessel stabilizer system.

31. The system of claim 27 wherein the connector is removable to allow the arm to rotate to align a fixed housing and said arm so a removable stop can be installed to position the fin in a fixed position.

\* \* \* \* \*